United States Patent
Djemai et al.

(10) Patent No.: US 11,173,549 B2
(45) Date of Patent: Nov. 16, 2021

(54) PROCESS FOR PRODUCING A BETA-ALLOY TITANIUM NIOBIUM ZIRCONIUM (TNZ) WITH A VERY LOW MODULUS OF ELASTICITY FOR BIOMEDICAL APPLICATIONS AND ITS EMBODIMENT BY ADDITIVE MANUFACTURING

(71) Applicants: Abdelmadjid Djemai, Deuil la Barre (FR); Jean-Jacques Fouchet, Lombreuil (FR)

(72) Inventors: Abdelmadjid Djemai, Deuil la Barre (FR); Jean-Jacques Fouchet, Lombreuil (FR)

( * ) Notice: Subject to any disclaimer, the term of this patent is extended or adjusted under 35 U.S.C. 154(b) by 341 days.

(21) Appl. No.: 16/075,801

(22) PCT Filed: Nov. 30, 2016

(86) PCT No.: PCT/FR2016/053156
§ 371 (c)(1),
(2) Date: Dec. 18, 2018

(87) PCT Pub. No.: WO2017/137671
PCT Pub. Date: Aug. 17, 2017

(65) Prior Publication Data
US 2019/0111482 A1  Apr. 18, 2019

(30) Foreign Application Priority Data
Feb. 8, 2016 (FR) ....................................... 1600205

(51) Int. Cl.
*B22F 10/20* (2021.01)
*B22F 1/00* (2006.01)
(Continued)

(52) U.S. Cl.
CPC ............ *B22F 10/20* (2021.01); *B22F 1/0014* (2013.01); *B22F 1/0018* (2013.01); *B33Y 10/00* (2014.12); *B33Y 70/00* (2014.12); *C22C 1/045* (2013.01); *C22C 1/0425* (2013.01); *C22C 1/0458* (2013.01); *C22C 1/0491* (2013.01); *C22C 1/08* (2013.01); *C22C 14/00* (2013.01); *C22F 1/183* (2013.01); *C22F 1/186* (2013.01); *B22F 1/02* (2013.01); *B22F 3/15* (2013.01); *B22F 2301/205* (2013.01); *B22F 2304/054* (2013.01);
(Continued)

(58) Field of Classification Search
None
See application file for complete search history.

(56) References Cited

U.S. PATENT DOCUMENTS 5,169,597 A * 12/1992 Davidson ............... A61B 17/72
148/316

* cited by examiner

*Primary Examiner* — Colin W. Slifka
(74) *Attorney, Agent, or Firm* — Luis Figarella

(57) ABSTRACT

The invention relates to a forming method of an alloy comprising predominantly Ti β or nearby β stage, comprising the steps of:
Preparation of a homogeneous mixture of particle powder comprising micrometric particles of pure Ti and nanoscale particles of at least one additional element or compound promoting the beta phase of the Ti during its cooling from its phase transition temperature.
exposing said particle powder mixture to a focused energy source that is selectively heat at least a portion of a bed of said homogeneous powder mixture at a temperature between 850 and 1850° C. cooling of the part having undergone this exposure with conservation of the phase b of the Ti.

17 Claims, 4 Drawing Sheets

(51) Int. Cl.
*C22C 14/00* (2006.01)
*C22F 1/18* (2006.01)
*C22C 1/04* (2006.01)
*C22C 1/08* (2006.01)
*B33Y 10/00* (2015.01)
*B33Y 70/00* (2020.01)
*B22F 3/15* (2006.01)
*C22C 1/10* (2006.01)
*B22F 1/02* (2006.01)
*B33Y 80/00* (2015.01)

(52) U.S. Cl.
CPC ..... *B22F 2304/056* (2013.01); *B22F 2304/10* (2013.01); *B22F 2998/10* (2013.01); *B22F 2999/00* (2013.01); *B33Y 80/00* (2014.12); *C22C 1/101* (2013.01); *C22C 1/1084* (2013.01); *Y02P 10/25* (2015.11)

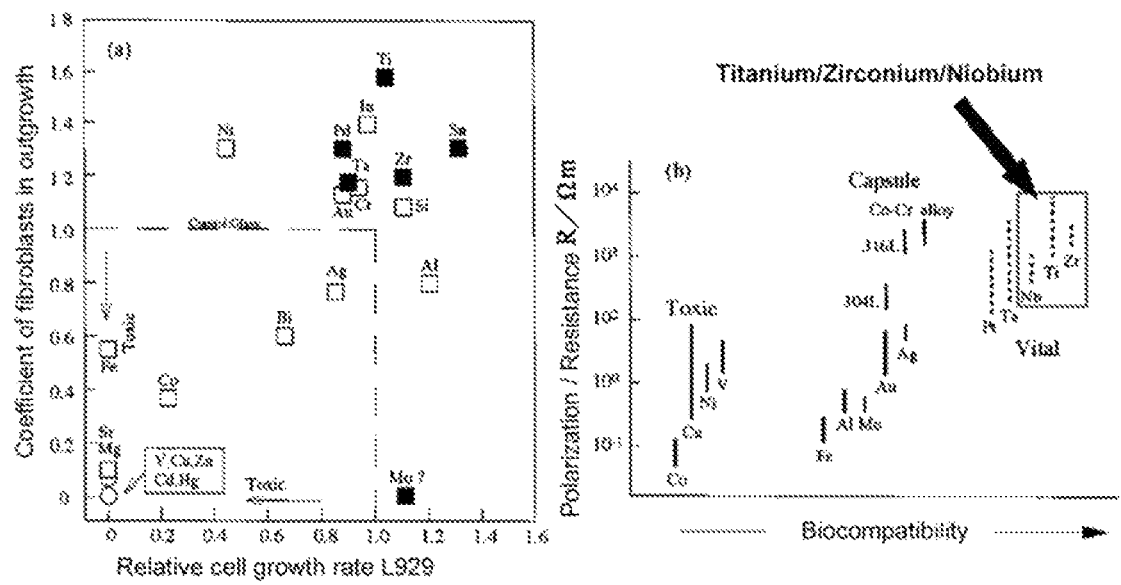
Fig -1-
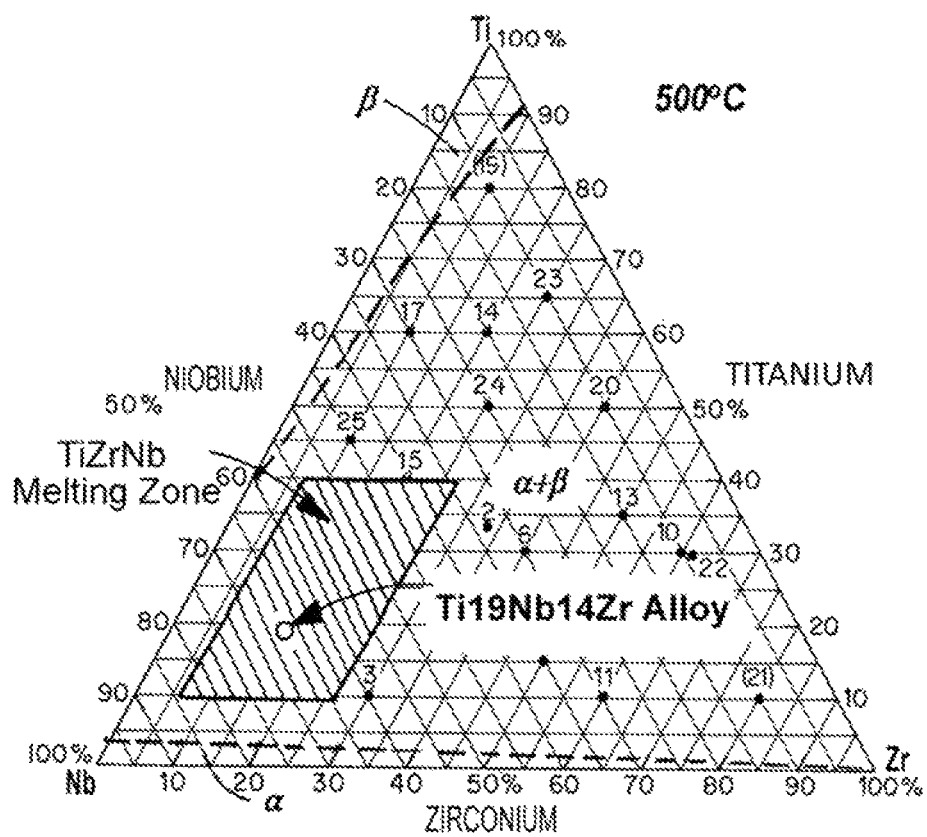
Fig -2-

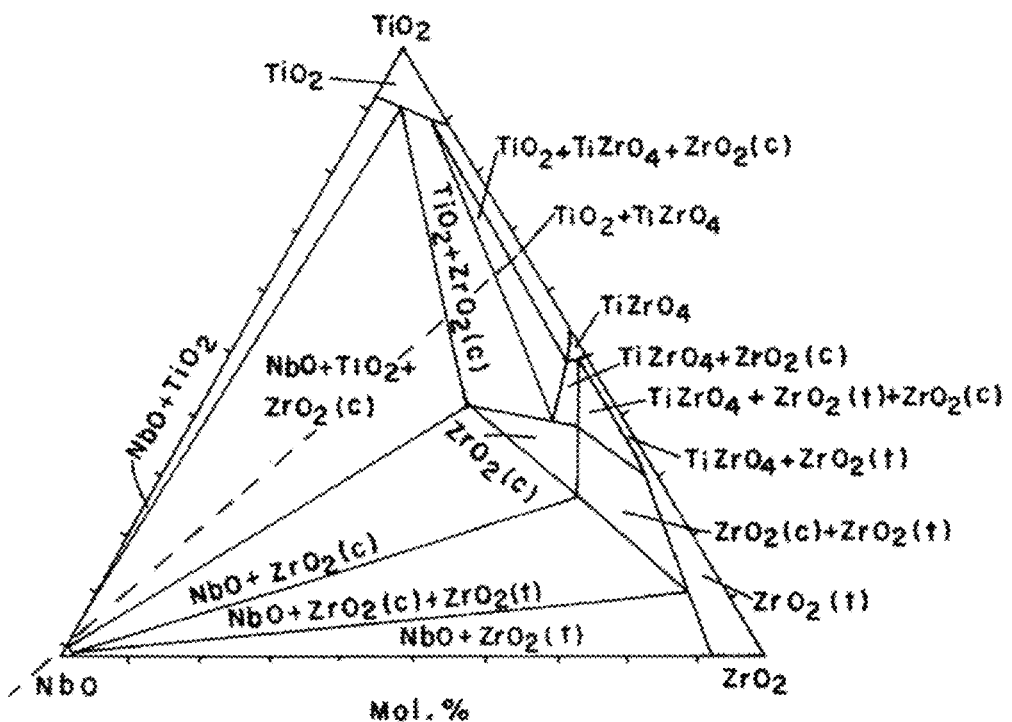
Fig -3-
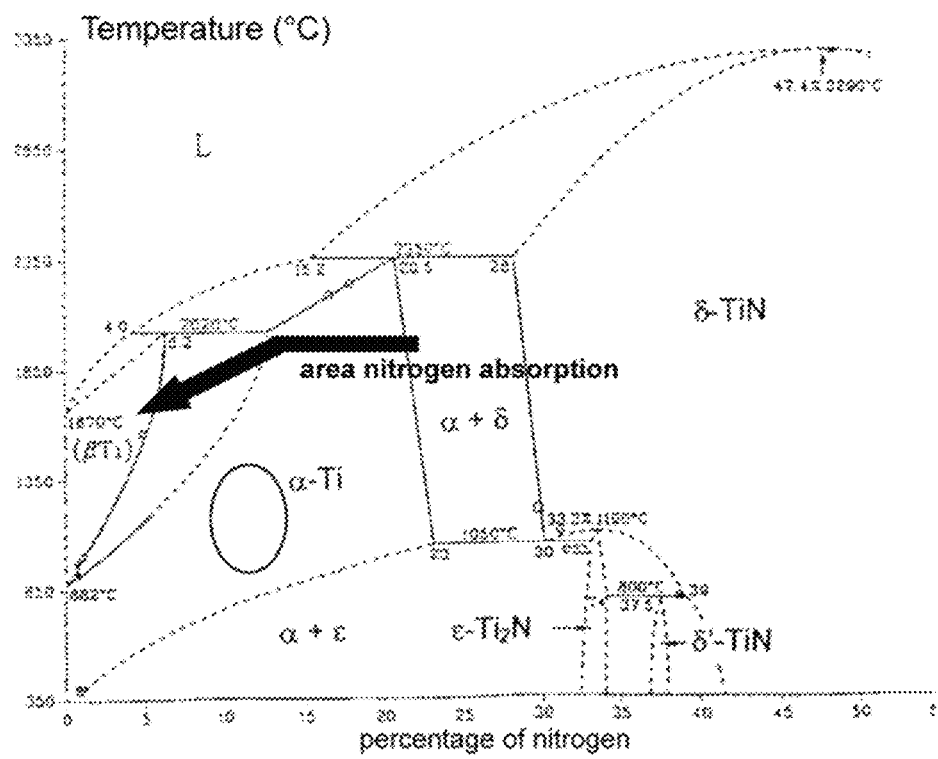
Fig -4-

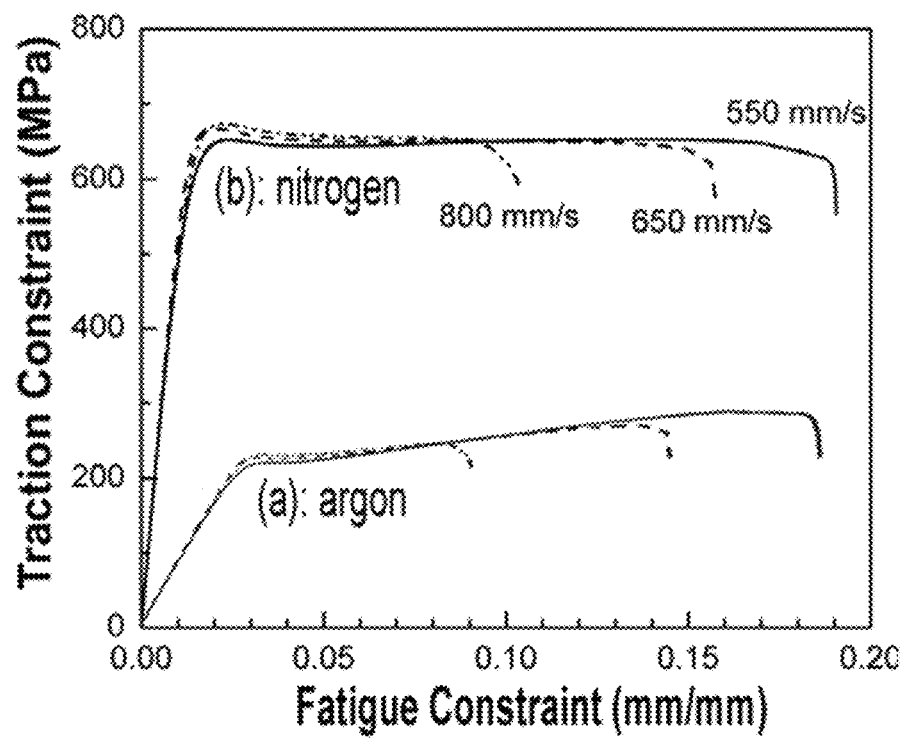
Fig -5-
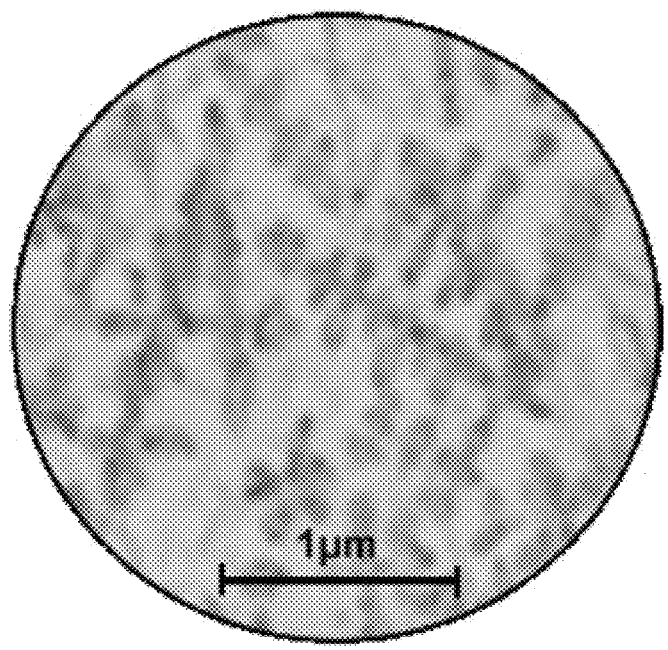
Fig -6-

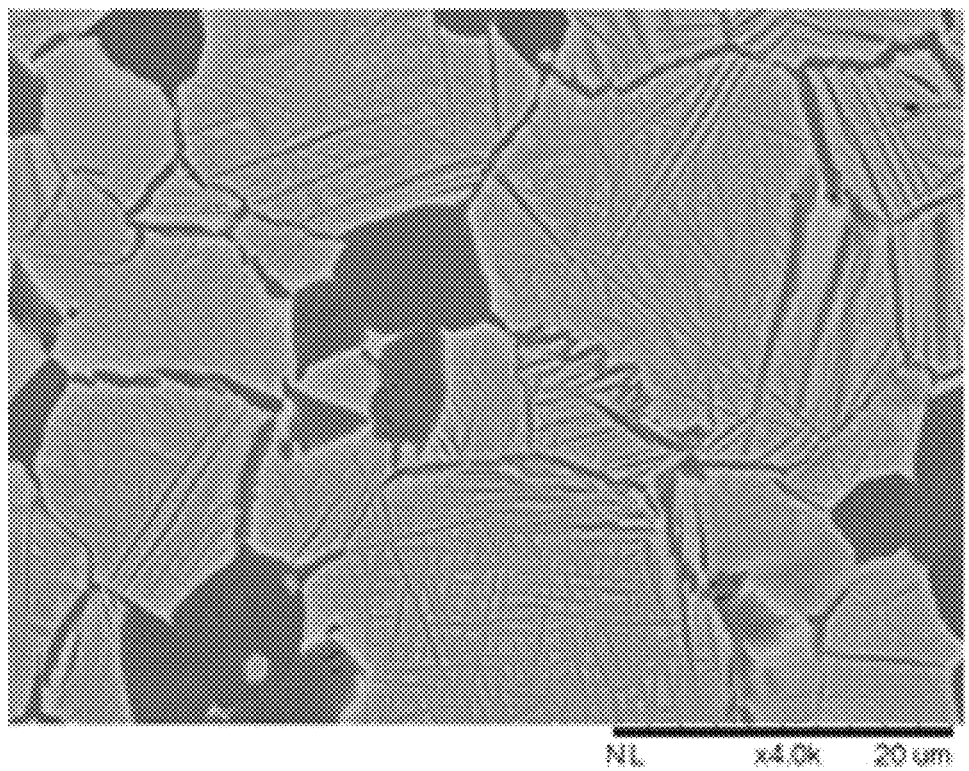
Fig -7-
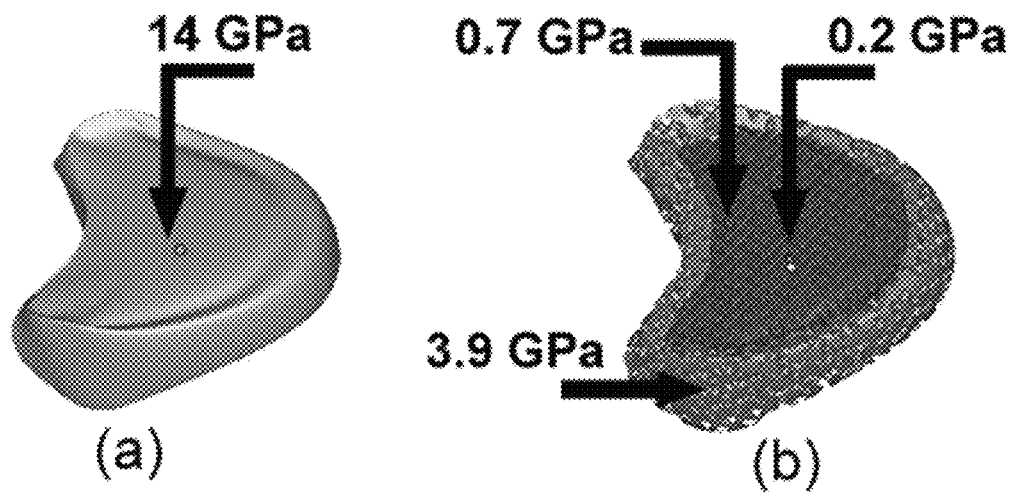
Fig -8-

PROCESS FOR PRODUCING A BETA-ALLOY TITANIUM NIOBIUM ZIRCONIUM (TNZ) WITH A VERY LOW MODULUS OF ELASTICITY FOR BIOMEDICAL APPLICATIONS AND ITS EMBODIMENT BY ADDITIVE MANUFACTURING

FIELD OF THE INVENTION

The present invention relates to a titanium alloy with a low modulus of elasticity, a high compressive strength, in particular with no harmful elements for the human body, and more particularly a beta-titanium-based alloy with a low Young's modulus.

STATE OF THE ART AND ITS DISADVANTAGES

Medical prostheses and implants are currently made from Cr—Co alloys, stainless steel, titanium (grade 2) or alpha+beta biphasic titanium alloys TA6V ELI).

Titanium and its alloys are mainly used for their mechanical properties and their biocompatibility. Historically designed for aeronautics, they were subsequently adapted to the biomedical field.

This adaptation, however, raises the problem of the potential increased cytotoxicity of vanadium and aluminum contained in the Ti-6Al-4V alloy. Indeed, the accumulation of vanadium in the body is associated with risks of irritation of the respiratory system and the absorption of aluminum is also harmful because it may cause neurological disorders, including Alzheimer's disease, as reported in the "Titanium: A New Allergen." study by Professor Laurence Evrard, head of the Department of Stomatology and Maxillofacial Surgery at Erasmus Hospital in Brussels, Belgium, published in 2011 in the journal Intech.

Due to the controversy regarding potential toxic effects of vanadium and aluminum compounds, vanadium and aluminum free alloys such as Ti-13Nb-13Zr (ASTM F1713), Ti-6Al-7Nb and Ti-5A1-2.5 Fe have recently been developed for biomedical applications.

Improving chemical biocompatibility requires a new formulation that replaces potentially toxic elements with other chemically biocompatible elements. Similarly, a mechanical property such as specific resistance, sought in aeronautics, must be associated in biomechanics with a lowering of the modulus of elasticity.

Mechanical biocompatibility consists in adapting the stiffness of the implant to that of the bone in order to ensure a more homogeneous mechanical load transfer favorable to osseointegration. The modulus of elasticity of titanium alloys, although lower than that of steel, remains high (110 GPa) when compared to that of host biological tissues (10 to 30 GPa for bone).

As early as the 1990s, the problem of the effect of stress shielding (SS) was often raised, and that comes down to the resorption of the bone at the bone/implant interface. Stress shielding (SS) is caused by the difference in modulus of elasticity between that of natural bone with a low modulus of elasticity (10 to 30 GPa) and that of the biocompatible material with a high modulus of elasticity (110 GPa for Ti-6AI-4V).

For example, a metal implant with a high modulus of elasticity carries more load applied to the region around that implant and the natural bone in the region bears no tension, due to compression and flexion, the Thickness and weight of the natural bone is being progressively reduced, which causes serious problems like osteoporosis around the implant or necrosis. As the natural bone is weakened, the density of the bone tissue cortex decreases and thus the binding force between the natural bone and the artificial implant also decreases, resulting in a decrease in the life of the implant.

As a result, a demand has emerged for a metal that is safe for the human body and has a modulus of elasticity as low as possible to approach that of the bone of the human body.

Des alliages de type Ti-13Nb-13Zr (ASTM F1713), Ti-12Mo-6Zr-2Fe (ASTM F1813), Ti-15Mo (ASTM F2066), Ti-35Nb-5TA-7ZR et Ti-16Nb-13Ta-4Mo ont été développés pour résoudre les problèmes mentionnés ci-dessus.

Alloys of Ti-13Nb-13Zr (ASTM F1713), Ti-12Mo-6Zr-2Fe (ASTM F1813), Ti-15Mo (ASTM F2066), Ti-35Nb-5TA-7ZR and Ti-16Nb-13Ta-4Mo have been developed to solve the problems mentioned above.

However, titanium alloys which have been developed until now, have an elastic modulus of about 60 GPa to about 80 GPa, which is still much higher than the elasticity of natural bone module ranging from 10 to 30 GPa.

The State of the Art can be Defined by the Following Patents:

U.S. Pat. No. 4,952,236 describes a process for the preparation of a titanium alloy with high strength, a low Young's modulus, ductile, a biocompatible titanium alloy (typical composition Ti-11.5Mo-6Zr-2Fe), which is characterized by a modulus of elasticity not exceeding 100 GPa. However, the elastic modulus values of the Ti-11.5Mo-6Zr-2Fe alloys are in the range of about 62 to 88 GPa, with no possibility of reducing the modulus of elasticity, U.S. Pat. No. 5,169,597 describes a biocompatible titanium alloy with a low Young's modulus (typical composition Ti-13Zr-13Nb). This alloy can be used as a material for medical prosthetic implants especially where a low modulus of elasticity is important. Again, the modulus of elasticity values of Ti-13Nb 13Zr— alloys are at best of the order of 80 GPa, U.S. Pat. No. 6,752,882 discloses a biocompatible titanium-niobium (Ti—Nb) biocompatible alloy, which has a low Young's modulus with high strength and contains a beta phase as the main phase. The Ti—Nb binary alloy contains 10 to 30 wt % Nb, preferably 13 to 28 wt % Nb, and balance titanium, which is suitable for making an orthopedic implant or dental implant. The modulus of elasticity values of Ti—Nb binary alloys are in the range of 61 to 77 GPa, US patent application publication US2007/0163681 discloses titanium alloys with a low Young's modulus (52 to 69 GPa) and with high strength (elastic limit 990 MPa after cold rolling). The titanium alloy contains vanadium, 10 to 20% by weight, aluminum of 0.2 to 10% by weight, and the balance being essentially titanium. The alloy has a microstructure comprising a martensitic phase. However, no ductility to traction is presented. After cold rolling, this alloy shows very little ductility and contains potentially toxic elements (Vanadium and aluminum).

U.S. Pat. No. 6,607,693 describes a titanium alloy, characterized by a Young's modulus of 75 GPa and a high tensile elasticity of the order of 700 MPa limit or more. This alloy comprises a Group V element (vanadium group) in an amount of 30 to 60% by weight and the rest of the titanium, and can be used in a variety of fields that require a low Young's modulus and high elastic deformability. This alloy contains potentially toxic elements (Vanadium).

a titanium alloy having excellent forming properties (a ply having a maximum ductility radius/thickness 2) is described in U.S. Pat. No. 2,864,697. The typical composition of this alloy is Ti-15V-2.5Al (% By weight, however, the excellent forming properties can not be obtained in the state of solution in which the resistance is very low (elastic limit of 275 MPa). If the yield strength is increased to 700 to 800 MPa using aging treatment, the ductility and forming properties are decreased (radius/thickness 5-10), but the Young's modulus is also increased.

All these patents disclose means and methods for producing titanium alloy for lowering the modulus of elasticity, but not allowing closer approximation of the modulus of elasticity of the bone and/or do not give solution to avoid the use of potentially toxic compounds.

In addition, several recent publications deal with the topic of beta alloys for the realization of medical implants, the most relevant publications are:

"Manufacture by selective laser melting and mechanical behavior of a biomedical Ti-24Nb-4Zr-8Sn alloy" published on Apr. 2, 2015 in the journal ScienceDirect.

"Microstructure and mechanical properties of novel beta titanium metallic composite by Selective Laser Melting" published Jan. 18, 2014 in the journal Acta Materialia.

"Microstructure, elastic deformation behavior and mechanical properties of biomedical β-type titanium alloy thin-tube used for stents" Published Feb. 11, 2015 in the journal ScienceDirect.

"Topological design and additive manufacturing of bone scaffolds and orthopedic implants: A review" published Jan. 6, 2016 in the journal "Biomaterials" ScienceDirect.

All these publications agree on the undeniable advantages of the implementation of a new generation of biomaterials with low modulus of elasticity and the undeniable advantages of additive manufacturing in their shaping.

However, in these examples, the lowest modulus of elasticity reported in the literature so far for titanium (Ti)-based alloys developed for biomedical applications is 40 GPa for the Ti-39Nb-6Zr alloy.

It is thus even higher than that of the cortical bone (10 to 30 GPa) and in particular very far from that of the cancellous bone with a Young's modulus of between 0.01 GPa and 3 GPa.

In order to further reduce the modulus of elasticity of titanium-based alloys, attempts have been made to make porous alloys by adding soluble additives or by producing honeycomb structures as reported in the publication "Topological Design and Additive Manufacturing". porous metals for bone scaffolds and orthopedic implants: A review».

Studies have shown that the modulus of elasticity is a property that does not vary easily and that porous materials from a TA6V alloy (the most commonly used for orthopedic implants) always have a high modulus of elasticity close to that of the massive alloy.

The main idea of porous alloys is to reduce stiffness and provide better biological fixation to the bone by promoting the growth of bone tissue in the pores of the implants, allowing better stress/load transfer in a way homogeneous between the bones and the implant.

At present, titanium and its porous alloys have become an important aspect of biomaterials. They are of great interest to biomaterials researchers because Ti-based alloys with adequate porosity are ideal for cell adhesion, viability, bone growth, and osseointegration. There have been numerous studies and research on various porous coatings and porous matrices at macro, micro and nano scales, as reported in the publication "Osteoblast cell response to nanoscale SiO2/ZrO2 particulate-reinforced titanium composites and scaffolds by powder metallurgy" Published in Journal of Materials Sciences.

However, these approaches do not provide viable solutions for stress shielding (SS) bone resorption because the Young's modulus of the solid material is very high (at best 40 GPa), bring it down to 2 GPa by playing on the porosity rate, is to weaken the structure by trying to give elasticity to the alloy.

The main reason for poor fixation of biomaterials to bone tissue remains the problem of inadequate modulus of elasticity between biomaterials and surrounding bones (implant medium). However, the implanted materials must be strong and durable enough to withstand the loads and/or shocks and hold the longest without failure.

An appropriate balance between strength and stiffness is to be found to get as close as possible to the mechanical characteristics of the bone and to solve the bone resorption problem at the bone/implant interface ("stress shielding").

There is therefore a considerable demand for a material that is not harmful to the human body, having a modulus of elasticity close to the bone and having a high resistance to fatigue.

SUMMARY OF THE INVENTION

The invention solves this problem by proposing a process for shaping an alloy comprising mainly Ti in the β or close β phase, comprising the steps of:

preparing a homogeneous mixture of particle powder comprising micrometric particles of pure Ti and nanometric particles of at least one additional element or compound promoting the beta phase of the Ti during its cooling from its phase transition temperature α/β exposing said particulate powder mixture to a focused energy source which selectively heats at least a portion of a bed of said homogeneous powder mixture at a temperature between 850 and 1850° C.

cooling of the part having undergone this exposure with conservation of the b phase of Ti.

The invention may have one or both of the following features:

the compound promoting the beta phase of Ti is chosen from Zr, Nb, Ta, Mo, Sn, Hf, Ga, Ag, Fe, Pd, Pt, Al, Si, Mn, Au, Co, Au, W, Ru, Rh, Cd, In, Cr.

The homogeneous particle powder mixture comprises nanometric particles of a single compound promoting the beta phase of Ti, to form a binary alloy of Ti beta.

The compound promoting the beta phase of Ti is chosen from Zr, Mo, Ta, Mn, Nb or Cr The compound promoting the beta phase of Ti is Zr and the powder mixture comprises particles of at least one first additive element selected from the group Nb, Ta, Mo, Sn, Hf, Ga, Ag, Fe, Pd, Pt, Al, Si, Mn, Au, Co, Au, W, Ru, Rh, Cd, In the compound promoting the beta phase of Ti is Zr, forming, with Ti, a binary alloy TZ, Ti being present in the alloy with a proportion of 65 to 95% by weight, and Zr with a proportion of 5 to 35% in weight the homogeneous mixture of particle powder comprises nanometric particles of two compounds promoting the beta phase of Ti, in order to form a ternary alloy of beta Ti the two compounds promoting the beta phase of Ti are chosen from Nb—Zr, Nb—Mo, Nb—Pd, Nb—Sn, Nb—Ta, Nb—Fe, Mo—Zr, Mo—Nb and Mo—Fe duos., Al—Cr, Cr—Nb, Sn—Cr, Al—Mn, Ta—Nb, Ta—Sn, Zr—Ta, Mn—Fe, or Sn—Cr the two compounds promoting the beta phase of Ti are Zr and Nb, forming, with Ti, a TNZ ternary alloy, Ti being present in the alloy with a proportion of 60 to 60% by weight, Zr with a proportion of 5 to 35% by weight, the Nb with a proportion of 5 to 30% by weight the two compounds are Zr in a content of 14% by weight of the alloy and Nb in a content of 19% by weight, the remainder being Ti, the alloy formed being Ti-19Nb-14Zr the step of exposing said mixture to a focused energy source is carried out in a closed chamber under nitrogen gas in proportions of between 5 and 10% by weight of the alloy the homogeneous mixture of particle powder comprises nanometric particles of three compounds promoting the beta phase of the Ti, in order to form a quaternary alloy of Ti beta the three compounds promoting the beta phase of Ti are chosen from trios Ta—Zr—Sn, Ta—Zr—Mo, Nb—Zr—Sn, Nb—Zr—Fe, Nb—Ta—Zr, Nb—Ta—Sn, Nb—Ta—Mo, Nb—Mo—Sn, Mo—Zr—Fe, Fe—Ta—Zr, Cr—Mn—Sn.

the three compounds promoting the beta phase of Ti are Zr, Nb and Ta, forming with Ti a quaternary alloy TNZT, Ti being present in the alloy with a proportion of 60 to 60% by weight, Zr with a proportion of 5 to 35% by weight, Nb with a proportion of 5 to 30% by weight and Ta with a proportion of 1 to 3% by weight the particle size of the micrometric particles of Ti is between 5 and 50 microns the particle size of the nanometric particles of the additional element is between 5 and 250 nm the energy source comprises a modulable laser-like energy source (SLM) or electron beam (EBM) or is released during a powder sintering operation (SLS) or by spraying powders on a beam Laser (PFLAM) or 3D printing or induction Fusion (ISM) or Vacuum Induction Fusion (VIM) or Vacuum Arc Reflow (VAR) or Plasma Arc Fusion (ARC) fusion or by hot isostatic pressing (HIP) or metal injection molding (MIM)

the exposure time of an area of the homogeneous mixture is less than 5 seconds and greater than 10 ms The invention also relates to a method of manufacturing an object of a given geometric shape, consisting of an alloy made according to the method of one of the preceding claims, comprising the steps of:

According to the geometrical shape to be produced, preparation of virtual slices of the object to be made of given thickness along an axis of construction of the object, Preparation of a homogeneous mixture of Ti powder and of an additional element promoting the beta phase of the Ti on cooling from its phase transition temperature α/β, the particle size of the titanium powder being micrometric and the particle size of the additive element being nanometric, Depositing on a substrate a layer of the powder mixture of a thickness corresponding to that of the wafer of the geometric shape to be produced Exposing said powder mixture of said first layer to a focused energy source which selectively heats a portion of the bed of said powder mixture at the locations corresponding to the virtual wafer to be produced, whereby a first wafer of the geometrical shape is obtained; to be carried out in the Ti alloy in the beta phase, in the first layer of powder mixture Depositing an nth layer of powder mixture on the preceding layer including the edge of the object made in the previous step, and exposing the nth layer to the focused energy source to obtain a n-th slice of the geometric shape to achieve Repetition of the preceding step until the geometric shape to be achieved is obtained.

Ideally, the geometric shape to be formed consists at least in part of a network of interconnected unit cells defining a porous structure The invention also relates to a biocompatible object, such as an implant or a prosthesis, made by the implementation of the preceding method with as additive stabilizing elements of the titanium phase, Zr and/or Nb and an object of the automotive or aeronautical industry carried out by the implementation of the aforementioned process.

The invention also relates to a composite material obtained by heating at a temperature above the transition temperature α/β, and by cooling a homogeneous mixture of titanium microparticles and nanoparticles of an additive element promoting the beta phase of the titanium during its cooling from a transition temperature and Zr, Nb, Ta, so as to forming a binary, ternary or quaternary alloy of beta-titanium, which ideally:

defines a network of microscopic formations containing predominantly titanium surrounded by ranges comprising the additive element and/or comprises two additive elements consisting of Zr and Nb, in mass proportions Ti: 19% and Zr: 14%, the remainder being Ti, comprising crystalline formations of Zr-reinforced titanium surrounded by ductile Nb ranges consists of a network of interconnected unit cells defining a porous structure has a porosity of between 60% and 70%, a pore size of between 250 µm and 700 µm and a pore distribution of between 800 µm and 1800 µm with total interconnectivity and a compressive strength greater than 100 MPa.

The invention also relates to a biocompatible object, such as a dental implant, surgical and associated instruments or a prosthesis or an intersomatic cage or a stent comprising a portion made with the material above.

DESCRIPTION OF THE FIGURES

FIG. 1: Biological safety of metals (a) Cytotoxicity of pure metals (b) Relationship between polarization resistance and biocompatibility of pure metals.

FIG. 2: Phase diagram at 500° C. titanium, zirconia and niobium (TZN) published by E. Levin, H. McMurdie, Phase Diagrams for ceramists, 1975 in American Ceramic Society P. 169

FIG. 3: Phase diagram at 1500° C. of titanium, zirconia and niobium oxides (TZN)

FIG. 4: Ti—N equilibrium diagram after (A. L. Thomann 1995)

FIG. 5: Tensile stress/stress stress diagram under argon and under nitrogen

FIG. 6: SEM image of spatial distribution of Ti19Nb14Zr alloy components

FIG. 7: microstructure of Ti19Nb14Zr alloy

FIG. 8: Example of realization of an intervertebral disc (DIV) with Ti19Nb14Zr alloy

DETAILED DESCRIPTION

The present invention aims to create a material that is not harmful to the human body, having a modulus of elastic close to the bone and having a high resistance to fatigue.

For this purpose, the invention generally relates to a process for shaping an alloy comprising mainly Ti in the β or near β phase, comprising the steps of:

Preparation of a homogeneous mixture of particle powder comprising micrometric particles of pure Ti and nanoscale particles of at least one additional element or compound promoting the beta phase of the Ti during its cooling from its phase transition temperature α/β.

exposing said particle powder mixture to a focused energy source which selectively heats at least a portion of a bed of said homogeneous powder mixture at a temperature between 850 and 1850° C.

cooling of the part having undergone this exposure with preservation of the beta phase of Ti.

So that the additional element(s) can promote the conservation of the beta phase of the titanium during its cooling, they are provided in the form of nanoparticles with a particle size of between 5 and 700 nm, preferably between 5 and 250 nm and the Ti particles, a particle size of between 5 and 200 microns, preferably between 5 and 50 microns.

Furthermore, preferably, the focused energy source is a laser spot programmed to act on a melting zone during an exposure time of less than 5 seconds and preferably greater than 10 ms, so that this melting zone reaches or exceeds a heating temperature of 850° C. where the titanium transition a/b occurs, and preferably attains or exceeds the melt melting temperature of 1650° C. titanium being limited to 1850° C.

Other energy sources can of course be suitable such as the electron beam (EBM) or is released during a powder sintering operation (SLS) or by projection of powders on a laser beam (PFLAM) or projection of 3D Printing or induction Melting (ISM) or Vacuum Induction Fusion (VIM) or Vacuum Arc Reflow (VAR) or Fusion Plasma Arc Fusion (ARC) or Hot Isostatic Compression (HIP)) or metal injection molding (MIM)

For an application in the medical field, the preferred metal powder consists of Zr in a content of 14% by weight of the alloy and Nb in a content of 19% by weight, the remainder being Ti, the alloy formed being Ti-19Nb-14Zr, the Ti having a particle size of between 5 and 50 microns, and Nb and Zr, a particle size of between 5 and 250 nm.

It is important to obtain a homogeneous mixture of powders, that is to say in which a majority of the metal microparticles are each surrounded by nanoparticles of additive element, without aggregates of these nanoparticles. For this purpose, these powders are mixed in the proportions indicated in a mixer or blender, and subjected to stirring for x min with a stirring frequency of . . . . The mixing of the powders is carried out under inert gas type argon or vacuum to obtain a homogeneous mixture with formation of films coating the titanium particles with the nano powders of additive elements, without any segregation or agglomeration of the nano powders and having a flowability and compaction appropriate to the fusion techniques on powder bed.

Since the material according to the invention is generated by an additive manufacturing process, it is advantageous to shape it according to a given geometric shape, at the same time as it is created.

For this purpose, depending on the geometrical shape to be produced, virtual slices of the object to be made of given thickness are prepared along an axis of construction of the object. It is possible that this shape includes porous areas allowing for example bone growth or allowing the final object to have desired mechanical properties.

A homogeneous mixture of micrometric titanium powder and nanometric powder of an additive element promoting the beta phase of titanium is used when it is cooled down from the transition temperature α/β (for example Zr, Nb) which is depositing on a substrate in the form of a layer of the powder mixture having a thickness corresponding to that of the wafer of the geometric shape to be produced or of a thickness of between 5 and 50 μm.

The powder mixture of said first layer is then exposed to the laser spot which selectively fuses a part of the bed of said powder mixture at the locations corresponding to the virtual wafer to be produced. To form a porous structure, the spot is moved to define a network of interconnected unit cells defining a porous structure as will be explained in the following.

This gives a first portion of the geometric shape to be produced, within the first layer of powder mixture.

An operation is repeated for depositing an n-th layer of powder mixture on the previous layer including the edge of the object made in the previous step, and exposing the n-th layer to the source of focused energy to obtain an nth slice of the geometric shape to achieve until obtaining the geometric shape to achieve.

This method according to the invention makes it possible to obtain a biocompatible object, such as an implant or a prosthesis, when biocompatible metal powders are used.

It makes it possible to obtain objects of the automotive or aeronautic industry of great precision and with interesting mechanical properties.

In the following, certain aspects of the method and of the material according to the invention are described with reference to the figures:

Preferred Biocompatible Material

The present invention relates to the production of a titanium alloy with a low modulus of elasticity, a high compressive strength, in particular with no harmful elements for the human body, and more particularly a beta-based alloy. titanium with a low Young's modulus, in particular titanium (Ti), niobium (Nb) and zirconium (Zr) in an advantageously selected formulation (Ti19Nb14Zr), the component elements of this alloy being the least toxic materials, and which are closest to life as shown in FIG. 1(b), and have the highest fibroblast survival and growth rate as shown in FIG. 1(b).

According to the invention, the Ti19Nb14Zr alloy as prepared and fused has a modulus of elasticity equal to 14 GPa. This low modulus of elasticity is well understood in view of the phase diagram of the titanium, zirconia and niobium (TZN) of FIG. 2, where the melting zone TiZrNb is clearly identified in its B-metastable phase, unstable mechanically, so as to obtain biphasic alpha "+/beta microstructures which have super-elastic properties, in fact the Ti19Nb14Zr alloy is close to β and which under stress of the close alpha phase responsible for the super-elastic effect elastic has the lowest elasticity score for a titanium-based alloy.

All combinations of inter reactions between Ti/Zr/Nb materials in the presence of oxygen as shown in FIG. 3 which represents the phase diagram at 1500° C. of titanium, zirconia and niobium (TZN) oxides.

According to the invention, the part issuing from the melting chamber undergoes a thermal treatment under nitrogen according to which it is introduced into a metal thermal furnace capable of rising up to 3000° C. where nitrogen (N) is added under its control. gaseous form in proportions between 5 and 10% under a pressure advantageously between 10 and 12 bar and in a temperature range between 850° and 1850° C., as shown in FIG. 4 where the absorption zone Nitrogen is well identified, to improve the tensile stress from 200 MPa to over 600 MPa while maintaining the same elasticity, as shown in FIG. 5 where it is found that the stretching stress is tripled. This heat treatment is intended to give additional hardness by maintaining the same elasticity and decreasing the residual stresses between the layers made successively of the piece. Ideally, the thermal treatment under nitrogen is carried out at 1100° C. for 45 minutes.

FIG. 6 shows a SEM image of the Ti19Nb14Zr alloy with a spatial distribution of Ti/Zr/Nb components.

In the SEM image of the figure, the crystalline formation of titanium reinforced by Zirconium in the microstructure of the Ti19Nb14Zr alloy, surrounded by a large range of ductile Niobium, is clearly visible, which explains the very low level of the Young.

FIG. 8 illustrates, by way of example, the production of an intervertebral disc (DIV) based on the Ti19Nb14Zr alloy, (a) the realization of the implant without a porous structure with a Young's modulus of 14 GPa. which corresponds to the Ti19Nb14Zr alloy in its solid form.

(b) the realization of the implant with a delimitation of several areas, and in each area a porous architecture is applied which is closest to the architecture of the bones that have areas with different elastic moduli.

Realization of an Intersomatic Cage

The invention also relates to the production of an anatomically shaped intersomatic cage as illustrated in FIG. 8 with a biocompatible material having a low Young's modulus and thus a certain elasticity, and by an additive manufacturing process, as described herein above.

This cage is composed of:

1—an outer wall with semi-rigid porous structures (2-1), intended to support the compression of the bone bodies, in the case of the example of the present invention two vertebrae adjacent to an intervertebral disc 2—an internal space with a more flexible lattice structure exposed by a first melting face (2-2) intended to come into contact with one of the bone bodies (4-1), second melting face (2-3), opposite to the previous one intended to come into contact with the other bone body, said melting faces (2-2) (2-3) are arranged parallel without contact with their internal faces, 3—a retractor member (2-4) in the form of a wedge to be split, inserted into a duct formed in the outer wall, between the two melt faces to push them against the bone bodies (4-1) (4-2) after its introduction. The conduit will be arranged to provide guiding to ensure the passage of the spacer member (2-4) in the middle of the merging faces (2-2) (2-3), and the spacer member configured to separate the one of the other the two melting faces. They may have a bevelled profile allowing them to be spaced apart from each other when the rod-shaped retractor member is depressed.

For a better understanding of the present invention, a longitudinal section of the intersomatic cage as shown in FIG. 3, illustrates the expansion system (3-6) of the melting faces (2-2) (2-3). The spacer member (3-5) is introduced into the space (3-3) located internally of the merging faces (2-2) (2-3), as it passes and with its wedge-shaped shape, said retractor member (3-5) pushes the merging faces (2-2) (2-3) against the upper face of the lower vertebra (4-2) and against the lower face of the upper vertebra (4-1).

A longitudinal section of the intervertebral cage installed between two vertebrae as indicated in FIG. 4, illustrates the self-locking system, characterized in that the ends of the intersections of the porous lattice of the external surfaces (4-3) and (4-5) of the two melting faces (2-2) (2-3) are in the form of pyramidal peaks (4-6). The so-called pyramidal peaks (4-6) are inserted into the upper face of the lower vertebra (4-2) and into the lower face of the upper vertebra (4-1) under the thrust stress of the retractor member (3-5), this blocking mode has the advantage of large hooking surfaces (4-3) (4-5) between the intervertebral cage (1-4) and the vertebrae (4-1) (4-5). 2). These attachment surfaces (4-3) (4-5) are lined with peaks that are introduced into the vertebrae, which advantageously promotes osteointegration and osteosynthesis by rapid colonization of the pores (3-2) of the cage interbody.

The material used for producing said intersomatic cage is a material of the type described above in the present invention, having a sufficient elasticity and compressive strength, for example the Ti19Nb14Zr alloy.

It is quite possible to design this cage with another type of material always biocompatible pure metal or metal alloys cobalt chrome type, tantalum, niobium, metallo-ceramic compounds or organo-metal or organo-ceramic or an organo-combination-ceramic metal.

In a preferred embodiment, three alloys of materials have been selected:

a titanium alloy aluminum vanadium Ti6Al4V grade 23, with an oxygen content <0.2%, A combination of a titanium alloy advantageously mixed with a zirconia-based material.

A combination of a titanium alloy advantageously mixed with a nickel-based alloy.

And in another preferred embodiment, a biocompatible material containing a zirconia/titanium binary composite material with zirconia powder concentrations of between 0.5% and 15%.

To further lower their modulus of elasticity, without unduly harming their mechanical properties, one or the other of these materials may also be present in a solid and or porous form:

in a solid or solid (in the non-porous) or slightly porous (semi-rigid lattice structure) for the outer wall and in a more porous form (flexible lattice structure) for the constitution of the melting faces 2-2 and 2-3 (with, for example, a difference in porosity of the order of 40% in order to allow their deformation towards the structure bone with the retractor.

For example, the flexible lattice structure of the melting faces has an advantageous porosity of between 45% and 90%, a pore size of between 70 μm and 900 μm and a pore distribution of between 300 μm and 850 μm with total interconnectivity. In another preferred embodiment, the flexible lattice structure of the melting faces has a porosity of between 65% and 85%, a pore size of between 100 μm and 650 μm with a distribution of porosity of between 450 μm and 700 μm and total interconnectivity. Its values are close to the characteristics of the microarchitecture of the bone at the level of the vertebrae.

The semi-rigid lattice structure of the outer wall has an advantageous porosity of between 10% and 70%, a pore size of between 300 μm and 900 μm and a pore distribution of between 500 μm and 2000 μm with total interconnectivity. In another preferred embodiment, the semi-rigid lattice structure of the outer wall has a porosity of between 25% and 45%, a pore size of between 450 μm and 650 μm and a pore distribution of between 800 μm and 1800 μm with total interconnectivity.

Other Materials According to the Invention

The present invention provides various titanium alloy compositions that are not harmful to the human body, have a modulus of elasticity as low as the bones of the human body, and at the same time have a high resistance to fatigue.

The invention provides for keeping the titanium in the beta phase because in this phase, the titanium has a low modulus of elasticity, thanks to the use of titanium alloy elements on the basis that they can serve as beta stabilizer of the titanium alloy to lower the modulus of elasticity.

Among the preferred alloying elements, elements of pure titanium alloy (Ti): zirconium (Zr) and niobium (Nb) were selected. This choice is dictated by the non-toxicity of said elements and which pose no risk to the human body.

For other applications, such as aeronautics, automotive or space, it will be possible to use other additive elements (see table) known to form with titanium alloys in the beta phase, and which are classified in three families: β binary alloys (TZ), β ternary alloys (TNZ), β quaternary alloys (TNZT) detailed in Table-1-

TABLE 1 three families of β titanium alloys

| (Currently Amended) β binary alloys | (Currently Amended) β ternary alloys | (Currently Amended) β quaternary alloys |
|---|---|---|
| Ti—Zr Alloy | Ti—Nb—Zr alloy | Ti—Ta—Zr—Sn alloy |
| Ti—Mo alloy | Ti—Nb—Mo alloy | Ti—Ta—Zr—Mo Alloy |
| Ti—Ta alloy | Ti—Nb—Pd alloy | Ti—Nb—Zr—Sn alloy |
| Ti—Mn alloy | Ti—Nb—Sn alloy | Ti—Nb—Zr—Fe alloy |
| Ti—Nb alloy | Ti—Nb—Ta alloy | Ti—Nb—Ta—Zr alloy |
| Ti—Cr alloy | Ti—Nb—Fe alloy | Ti—Mo—Zr—Fe alloy |
|  | Ti—Mo—Zr alloy | Ti—Fe—Ta—Zr alloy |
|  | Ti—Mo—Nb alloy | Ti—Cr—Mn—Sn alloy |
|  | Ti—Al—Cr alloy |  |
|  | Ti—Cr—Nb alloy |  |
|  | Ti—Sn—Cr alloy |  |
|  | Ti—Al—Mn alloy |  |
|  | Ti—Nb—Ta alloy |  |
|  | Ti—Ta—Sn alloy |  |
|  | Ti—Zr—Ta alloy |  |
|  | Ti—Mn—Fe alloy |  |
|  | Ti—Sn—Cr alloy |  |

The proportions of titanium, and its additive elements to achieve titanium alloy compositions having a very low modulus of elasticity (less than 20 GPa) can be determined by a predictive calculation method based on the simulation of chemical interactions, thermodynamics during fusion and the molecular orbitals method to design and develop a stable and suitable alloy for medical use.

Such a process comprises the calculation of covalent bonds, the energy level of the electrons as a function of the content of each alloying element, the thermodynamic reactions, the phase changes, the oxidation phenomena during the melting, using the electronic state which is the nucleus of variation at the atomic scale.

Most properties of a material are determined by its electrical state except for a nuclear reaction. Based on the electrical state of matter, one can determine its microparticles on the atomic scale, one can estimate the macro-properties of the material by carrying out a static analysis of the mechanics of the matter. For making families of alloys as shown in Table-1-. The micro proprieties of the material can be analyzed by their electrical state by interpreting the Schrödinger or Heitler equation and London and the like.

Example of Preparation Method for Nb/Zr Nano Powders

In the present invention, the preparation of the Ti—Zr—Nb alloy is characterized in that the particle size of the metal matrix Ti is at a micrometric scale of between 5 μm and 50 μm and the particle size of the additional elements is on a scale nanometer between 5 nm and 250 nm.

The Niobium nanoparticles (Nb) can be obtained by a reduction process which uses the sodiothermy of Nb2O5 as a raw material, sodium as a reducing agent and CaCl2, KCl, NaCl, LiCl as diluents. This process comprises reacting 20% excess sodium NaCl, CaCl2 with Nb2O5 to molten salts at 650° C. for 6 h. High purity niobium nanoparticles can thus be obtained.

The ultra-pure zirconium metal (Zr) nanoparticles can be obtained by laser ablation of a zirconium rod in isopropyl alcohol. This method makes it possible to obtain a colloidal solution of zirconium nanoparticles. In addition, the nanoparticle size distribution can be considerably reduced by using femto second laser pulses for ablation. An argon electroduced cathodic discharge plasma in molten salt is used for the fabrication of zirconium metal nanoparticles of diameter. median 50 nm.

According to an exemplary embodiment of the predictive model, the titanium alloy with a low elastic modulus comprises from 15% by weight to 25% by weight of niobium (Nb), from 10% by weight to 1.5% by weight of zirconium (Zr), the rest of the titanium (Ti) and unavoidable impurities.

Thus, according to the invention, the Ti—Zr—Nb titanium alloy at the output of the predictive model will have a modulus of elasticity of 14 GPa or less.

Niobium (Nb) is a major alloying element in the beta (β) titanium alloy according to the present embodiment, it is a gray, ductile and flexible metal. Niobium is known as a biocompatible metal because it is stable and shows no cytotoxicity to the cells of the human body. In addition, niobium is very stable at room temperature, and has a very high resistance to corrosion so that it is not corroded by oxygen and strong acids. It is preferred that the niobium be contained in the titanium alloy in a proportion by weight of from 15% to 20% by weight.

Experimentation and modeling have shown that the beta phase is difficult to form sufficiently outside this range of proportions and the modulus of elasticity increases considerably beyond 40% by weight up to 70 GPa or more. It is therefore preferable that the niobium be contained in the titanium alloy in a proportion by weight ranging from 15% to 20% by weight for certain specific applications where the Young's modulus must be particularly low.

The expected mechanical performance can be advantageously achieved by changing the amount of Nb in a range from 5% to 37.1% by weight.

Zirconium (Zr) has a very high resistance to corrosion in hot water and under acidic or basic atmosphere. Zirconium forms an oxide film even in the air, having a high resistance to corrosion. Zirconium is a biocompatible metal with no cytotoxic effect. It is preferred that the zirconium be contained in the titanium alloy in a range of 5% to 20% by weight.

Indeed, the modulus of elasticity of the ternary alloy (TNZ) of titanium, niobium and zirconium increases considerably outside this range, so that it can not be applied to a living body. It is preferable that the zirconium contained in the titanium alloy is in a range of 5% to 15% by weight.

Zirconium, being a neutral element, is capable of stabilizing both the α and β phases of the titanium alloy and acts by being in solution in the alloy as a β-stabilizer by slowing down the transformation process of the alloy. 'alloy. The larger ionic radius of zirconium (35% larger than that of titanium) contributes to disrupt ionic binding forces in the alloy, resulting in some reduction in modulus of elasticity.

According to an advantageous embodiment, it is possible to lower the modulus of elasticity of the titanium alloy to less than 20 GPa and preferably to less than 15 GPa.

Effects of Other Additives

In another mode of preparation and according to the use, one or more elements chosen from tantalum (Ta), hafnium (Hf), molybdenum (Mo), and tin (Sn) may be added to the titanium alloy in a range of less than 3% by weight. It is preferred that they be added in a range of 1% to 3% by weight.

In this case, it is preferable that the niobium content is from 37% to 39% by weight, and the zirconium content is from 5% to 7% by weight.

Tantalum (Ta) is a ductile material and has high mechanical strength even at high temperatures. Tantalum forms a stable film with high electrical resistance and has the particularity of being non-sensitive to air oxidation. In addition, tantalum is very resistant to acid, and has excellent compatibility with the human body, hence the value of its use for cementing bones. Tantalum (Ta) when combined with titanium serves as a major "beta stabilizer".

Hafnium (Hf) has characteristics very similar to zirconium, and has excellent resistance to corrosion and biocompatibility. It serves as a "beta stabilizer" when combined with titanium.

Molybdenum (Mo) has a relatively high melting point. However, it has excellent thermal conductivity, high corrosion resistance, even in a strong acid and has very favorable mechanical properties over a wide temperature range. It serves as a "beta stabilizer" when combined with titanium.

Tin (Sn) is air stable with excellent ductility, soluble in acids and alkalis and has a very low melting temperature of about 232° C. It is stable in the human body and therefore widely used in the fields of medical instrumentation and the like. It can also be used as a beta stabilizer when combined with titanium.

The addition of tantalum (Ta), hafnium (Hf), molybdenum (Mo), tin (Sn) elements in an amount greater than 3% by weight can affect the ternary titanium-niobium-zirconium (TNZ) system with increase in modulus of elasticity. Consequently, for certain specific applications where the Young's modulus must be particularly low, the maximum content of its elements in the titanium alloy is set at less than 3% by weight.

Preparation of Titanium, Zirconium, Niobium Mixtures

The mixtures according to the invention may also comprise one or more of the following optional characteristics:

Preferably, the titanium Ti content is greater than 40%, preferably greater than 60%, preferably less than 99.50%, preferably less than 95.5%.

A pure Ti titanium powder according to the invention may also rise one or more of the following optional characteristics:

A particle size less than 70 µm, preferably less than 45 µm; preferably less than 30 microns, preferably less than 10 microns, preferably greater than 5 microns.

In a first particular embodiment, the Zirconium powder (Zr) has a particle size of less than 250 nm, preferably less than 130 nm, and/or a median size of between 65 nm and 85 nm, a minimum size greater than 30 nm. nm;

in a second particular embodiment, the Zirconium powder (Zr) has a particle size of less than 75 nm, preferably less than 70 nm, and/or a median size of between 35 nm and 50 nm, and/or a size of minimum greater than 15 nm, preferably greater than 20 nm;

in a third particular embodiment, the Zirconium powder (Zr) has a particle size of less than 40 nm, preferably less than 35 nm, and/or a median size of between 10 nm and 25 nm, and/or a size minimum greater than 3 nm, preferably greater than 5 nm.

in a fourth particular embodiment, the Zirconium powder (Zr) has a particle size of less than 15 nm, preferably less than 10 nm, and/or a median size of less than 5 nm.

Preferably, the Niobium content (Nb) is greater than 3%, preferably greater than 13.5%, preferably less than 30.0%, preferably less than 60%;

preferably, the content of titanium dioxide $TiO_2$ resulting from the reaction of titanium with oxygen is less than 0.1%, preferably less than 0.3%, more preferably less than 0.2%, and or preferably greater than 0.01%, preferably greater than 0.1%;

preferably, the content of $TiO_2+TiZrO_4$ is between 0.1% and 0.5% and the $TiO_2$ content is between 0.1% and 0.2%; the content of "other oxides" is preferably less than 0.5%, preferably less than 0.25%, preferably less than 0.10%, preferably less than 0.05%, preferably less than 0.03%, preferably less than 0.02%, or even less than 0.01%, where the oxidation properties are advantageously improved;

preferably, the "other oxides" are impurities;

preferably, the content of $NbO+ZrO_2$ is less than 2.0%, less than 1.8%, less than 1.6%, or even less than 1.4%;

In another embodiment, the $NbO+TiO_2$ content is greater than 0.1%, greater than 0.2%, greater than 0.3%, greater than 0.4%, or even greater than 0.5%, greater than 0.6%, or greater than 0.7%.

The Ti titanium powders are mixed with nanometric powders of (Zr) and (Nb) in a particularly advantageous mixing mode, under argon-type inert gas or under vacuum until a homogeneous mixture with formation of films coating the titanium particles with the Zr and Nb nano powders without any segregation or agglomeration of the nano powders and having a flowability and compaction suitable for powder bed melting techniques.

The Ti—Zr alloy in the β-phase containing the two titanium and zirconia components, characterized in that the said alloy is a composite metal matrix composite (CMM) with a proportion of 65 to 95% by weight of Ti, 5 to 35% by weight Zr, in its binary form TZ.

The β-phase Ti—Zr alloy containing the two titanium and zirconia components, characterized in that this alloy is a metal matrix composite (MMC) alloy with a proportion of 25 to 60% by weight of Ti, 5 to 35% by weight Zr, 5 to 30% by weight of Nb, in its ternary form TZN.

The β-phase Ti—Zr alloy containing the two titanium and zirconia components, characterized in that this alloy is a metal matrix composite (MMC) alloy with a proportion of 25 to 60% by weight of Ti, 5 to 35% by weight Zr, 5 to 30% by weight of Nb and 1 to 3% by weight of Ta in its quaternary form TZNT.

The Ti—Zr alloy in the β-phase, characterized in that the particle size of the metal matrix Ti is between 5 µm and 50 µm and the particle size of the additional elements is between 5 nm and 250 nm.

The Ti—Zr alloy in the β-phase, in which is incorporated in at least a first additive element selected from the group (Nb, Ta, Mo, Sn, Hf, Ga, Ag, Fe, Pd, Pt, Al, Si, Mn, Au, Co, Au, W, Ru, Rh, Cd, In)

Formatting the Alloy

The Ti—Zr alloy is shaped by stacking layers of metal powders, selectively fused by concentration of a laser-like (SLM) or electron beam (EBM) modulatable energy source or powder sintering (SLS). on a bed of powder or by projection of metal powders on a laser beam (PFLAM) or projection of binders (3D printing) or induction fusion (ISM) or vacuum induction melting (VIM) or vacuum arc remelting (VAR) or melting by fusion plasma arc (ARC) by hot isostatic pressing (HIP) or metal injection molding (MIM). The preferred fusion mode is by SLM.

According to the invention and in a preferred but non-limiting embodiment, a Ti19Nb14Zr titanium beta alloy is prepared in the form of a metal powder and fused by a process for shaping TZN alloy by SLM under an atmosphere without oxygen, preferably under argon at a pressure of between 10 and 30 mbar.

Characteristics of Different Alloys According to the Invention

The Ti19Nb14Zr alloy, produced according to the invention, has a modulus of elasticity of between 10 GPa and 30 GPa in its solid block form. In another preferred embodiment, the modulus of elasticity is equal to 14 GPa as indicated in line 1 of Table-2.

TABLE 2 indication of modulus and phase of β titanium alloys according to the invention

| (Currently Amended) Lot | (Currently Amended) Alloy composition (Weight %) | (Currently Amended) Elasticity Module | (Currently Amended) Type of Alloy |
|---|---|---|---|
| 1 | Ti—19Nb—14Zr | 14 | Near β |
| 2 | Ti—24Nb—7.9Sn—4Zr | 33 | β |
| 3 | Ti—24Nb—4Zr—7.9Sn | 33 | β |
| 4 | Ti—38.9Nb—5.5Zr | 38.9 | β |
| 5 | Ti—39Nb—6Zr | 40 | β |
| 6 | Ti—40.9Nb—5ZR | 40 | β |
| 7 | Ti—37.9Nb—7.4Zr | 41.5 | β |
| 8 | Ti—29Nb—6TA—5ZR | 43 | β |
| 9 | Ti—35Nb—4Sn | 44 | β |
| 10 | Ti—35Nb—4Sn | 44 | β |
| 11 | Ti35Nb2Ta3Zr | <50 | β |
| 12 | Ti—10Zr—5TA—5NB | 51.97 | β |
| 13 | Ti (18-20) Nb—(5-6) Zr | 45-55 | Near β |
| 14 | Ti—25Nb—25Ta | 55 | β |
| 15 | Ti—29Nb—13Ta—7.1Zr | 55 | β |
| 16 | Ti—35Nb—7ZR—5TA | 55 | Near β |
| 17 | Ti—35Nb—5.7Ta—7.2Zr | 57 | β |
| 18 | Ti—28Nb—13Zr—2Fe | 58 | Near β |
| 19 | Ti—28Nb—13Zr—0.5Fe | 58 | Near β |
| 20 | Ti—29Nb—11Ta—5ZR | 60 | β |
| 21 | Ti—29Nb—13Ta—2Sn | 62 | β |
| 22 | Ti—12MB—5ZR | 64 | β |
| 23 | Ti—29Nb—13Ta—4.5Zr | 65 | β |
| 24 | Ti—25Nb—2MB—4Sn | 65 | Near β |
| 25 | Ti—29Nb—13Ta—4.6Sn | 66 | β |
| 26 | Ti—35Nb—5TA—7ZR—0.40 | 66 | β |
| 27 | Ti—34Nb—12Zr | 67 | β |
| 28 | Ti—34Nb—11Zr | 68 | β |
| 29 | Ti—35Nb—8.2Zr | 72 | β |
| 30 | Ti—42.2Nb—5.5Zr | 74 | β |
| 31 | Ti—12MB—5TA | 74 | Near β |
| 32 | Ti—29Nb—13Ta—4MB | 74 | β |
| 33 | Ti—29Nb—13Ta—6SN | 74 | β |
| 34 | Ti—12MB—6Zr—2Fe | 74-85 | β |
| 35 | Ti—13Nb—13Zr | 77 | Near β |
| 36 | Ti—15MB | 78 | β |
| 37 | Ti—15Mo—3Al—2.8Nb | 82 | Near β |
| 38 | Ti—7.5Mo—3 Fe | 85 | β |

Manufacture of a Porous Structure

The shaping process of the Ti—Zr ahoy according to the invention can advantageously cause the β-titanium alloy to have a porosity of between 60% and 70%, a pore size of between 250 μm and 700 μm and a thickness of pore distribution between 800 μm and 1800 μm with total interconnectivity.

Process for forming the Ti—Zr alloy, characterized in that the fused porous material has a modulus of elasticity of between 0.3 GPa and 1.4 GPa and a compressive strength greater than 100 MPa.

The porous material has elastic and compression limits similar to those of bone. By working on the geometry of porous structures, their sizes, their distributions, we can have different modulus of elasticity per zone which corresponds to the characteristics of a human bone (different elasticity modules whether cortical or spongy).

The Ti19Nb14Zr alloy fused with a controlled porosity has a modulus of elasticity of between 0.3 GPa and 1.4 GPa in its porous form.

According to the invention, the addition of the nitrogen (N) in its gaseous form during the melting and/or during the heat treatments in proportions of between 5 and 10% under a pressure advantageously selected and in a place of temperature included between 850° and 1850° C. improves tensile stress from 200 MPa to over 600 MPa while maintaining the same elasticity.

Benefits of Adding Nitrogen N

The present invention describes a composition of a titanium beta-alloy that is not harmful to the human body with a modulus of elasticity that approximates that of the bones of the human body and at the same time exhibits strong resistance to fatigue by adding nitrogen (N).

Indeed, the titanium beta-based alloy according to the embodiments of the present invention has a low elastic modulus and excellent mechanical properties. Therefore, it can be used in a variety of applications, for example, as a material for medical devices, such as artificial bones, artificial teeth and artificial hip joints, stents, staples, orthodontic wires and surgical instrumentation.

The Ti—Zr alloy is characterized in that the fused material has a modulus of elasticity equal to 14 GPa.

The Ti—Zr alloy is characterized in that the fused porous material has a modulus of elasticity of between 0.3 GPa and 1.4 GPa and a compressive strength greater than 100 MPa.

Achievement by Additive Manufacturing

The invention also relates to an embodiment by additive manufacturing of the Ti19Nb14Zr alloy according to the invention, in an embodiment by laser melting on a powder bed comprising the following successive steps:

A) preparing a digital file of a geometric shape to be produced, said digital file is sliced virtually from (1) to (n) in appropriate thicknesses with respect to the Z construction axis.

B) preparation of a homogeneous mixture of powder in the mass proportions Nb: 19% Zr: 14%, Ti: the remainder, the titanium powder being micrometric, the powder of Nb and Zr nanometric placed under argon of a chamber laser fusion C) heating of a substrate or titanium plate minimum temperature 200° C./maximum temperature 1500° C.

D) deposition of a first layer of Ti19Nb14Zr mixture on a substrate or a titanium plate according to step C), the thickness of the powder bed is less than 50 μm and greater than 5 μm E) A focused energy source selectively fuses a portion of the powder bed according to the slicing described in step A) around 1600° C.

F) Steps E) and F) are executed "n" times where (n) represents the number of layers of the shape to be made.

Example of parameters for implanting an implant on an SLM 125 HL machine from the manufacturer SLM SOLUTIONS GMBH.

| (Currently Amended) Parameter Type | (Currently Amended) Ternary alloy TZN | (Currently Amended) Quaternary alloy TZNS |
|---|---|---|
| Type of powder | Ti19Nb14Zr | Ti—24Nb—7.9Sn—4Zr |
| Laser power in the middle zone (w) | 400 | 300 |
| Low laser power (w) | 200 | 200 |
| Laser power in porous zone (w) | 150 | 100 |
| Exposure (ms) | 350 | 380 |
| Exposure Limit (ms) | 300 | 350 |
| Distance hatch (μm) | 25 | 10 |

The shaping of the Ti19Nb14Zr alloy is carried out by additive manufacturing according to the powder bed melting technology. A biomedical implant is made by a three-dimensional design software according to the digital data collected via an MRI or a 3D scanner.

The porous portion in whole or in part is predefined on the 3D model from a base cell, said base cell or unit cell is of geometric shape in three dimensions (x, y, z), formed by at least three edges, with a rounded shape, this shape is not limiting, with an angle opening of at least 10°, and the unit cell may be of regular or irregular shape in the form of pyramid, tetrahedron, cubic, octahedron, icosahedron, dodecahedron and without limitation of form.

Several forms of porosity can be selected with the possibility of parameterizing the pore distribution zones of different sizes.

Obtaining a Homogeneous Mixture of Powders

A homogeneous mixture of powders, that is to say in which a majority of the metal microparticles are each surrounded by ceramic nanoparticles, without aggregates of these ceramic particles, is obtained by mixing these powders in the proportions indicated within a mixer or blender, and subjecting them to three-dimensional stirring for 45 minutes to 10 hours with a continuous random stirring frequency or interrupted until a homogeneous stable mixture in the sense that the arrangement of Ceramic nanoparticles surrounding the microscopic particles of metal endures in the absence of oxygen. For example, the preferred mixer for this operation is a device called Turbulat®.

Advantage of Nitrogen Use

According to the invention, the part issuing from the melting chamber undergoes a thermal treatment under nitrogen according to which it is introduced into a metal thermal furnace capable of rising up to 3000° C. where nitrogen (N) is added under its control. gaseous form in proportions between 5 and 10% under a pressure advantageously between 10 and 12 bar and in a temperature range between 850° and 1850° C., to improve the tensile stress of 200 MPa to more than 600 MPa maintaining the same elasticity. This heat treatment is intended to give additional hardness by maintaining the same elasticity and decreasing the residual stresses between the layers made successively of the piece. Ideally, the thermal treatment under nitrogen is carried out at 1100° C. for 45 minutes.

The invention claimed is:

1. An additive manufacturing method of shaping an alloy comprising Ti in the β or near β-phase through the use of a laser-type modulable energy source for Selective Laser Melting (SLM), said method comprising the steps of:
preparing a homogeneous mixture of particles comprising a first set of particles consisting of pure Ti and a second set of particles comprising at least one additional element or compound that promotes conservation of β phase Ti when the homogeneous mixture is cooled below its α/β phase transition temperature, wherein the first particle has a size range of from 5 μm to 200 μm and the second particle has a size range of from 5 nm to 700 nm;
exposing the homogeneous mixture to said laser-type modulable (SLM) focused energy source to selectively heat at least a portion of a bed of the homogeneous mixture to a temperature between 850 and 1850° C. to generate a heated homogeneous mixture: and
cooling the heated homogeneous mixture to generate a Ti alloy comprising β phase Ti.

2. The method of claim 1, in which the compound that promotes conservation of β phase Ti is selected from the group consisting of:
Zr, Nb, Ta, Mo, Sn, Hf, Ga, Ag, Fe, Pd, Pt, Al, Si, Mn, Au, Co, Au, W, Ru, Rh, Cd, In and Cr.

3. The method of claim 1, wherein:
the second set of particles comprises a single element or compound that promotes conservation of β phase Ti, to form a binary Ti alloy comprising β phase Ti.

4. The method of claim 3, wherein:
the single element or compound that promotes conservation of β phase Ti is selected from the group consisting of Zr, Mo, Ta, Mn, Nb and Cr.

5. The method of claim 4, wherein:
the single element or compound that promotes conservation of β phase Ti is Zr and the homogenous mixture of particles further comprises particles of at least one first additive element selected from the group consisting of Nb, Ta, Mo, Sn, Hf, Ga, Ag, Fe, Pd, Pt, Al, Si, Mn, Au, Co, Au, W, Ru, Rh, Cd and In.

6. The method of claim 5, in which:
Ti is present in the binary Ti alloy at 65 to 95% by weight, and Zr is present in the binary Ti alloy at 5 to 35% by weight.

7. The method of claim 1, wherein:
the second set of particles comprises two elements or compounds that promote conservation of β phase Ti, wherein the Ti alloy is a ternary alloy comprising β phase Ti.

8. The method of claim 7, wherein:
the two elements or compounds that promote conservation of β phase Ti are selected from among the group of element or compound pairs consisting of:
Nb—Zr, Nb—Mo, Nb—Pd, Nb—Sn, Nb—Ta, Nb—Fe, Mo—Zr, Mo—Nb, Mo—Fe, Al—Cr, Cr—Nb, Sn—Cr, Al—Mn, Ta—Nb, Ta—Sn, Zr—Ta, Mn—Fe and Sn—Cr.

9. The method of claim 8, wherein:
the two elements or compounds that promote conservation of β phase Ti are Zr and Nb, thereby forming with Ti a TNZ ternary alloy wherein Ti is present in the TNZ ternary alloy at 25 to 60% by weight, Zr is present in the TNZ ternary alloy a 5 to 35% by weight, and Nb is present in the TNZ ternary alloy at 5 to 30% by weight.

10. The method of claim 9, wherein:
the TNZ ternary alloy comprises Zr at 14% by weight and Nb at 19% by weight, wherein remaining content is Ti, such that the TNZ alloy formed is Ti-19Nb-14Zr.

11. The method of claim 1, wherein:
the second set of particles comprises three elements or compounds that promote conservation of β phase Ti, wherein the Ti alloy is a quaternary alloy comprising β phase Ti.

12. The method of claim 11, wherein:
the three elements or compounds that promote conservation of β phase Ti are selected from the group of trios consisting of Ta—Zr—Sn, Ta—Zr—Mo, Nb—Zr—Sn, Nb—Zr—Fe, Nb—Ta—Zr, Nb—Ta—Sn, Nb—Ta—Mo, Nb—Mo—Sn, Mo—Zr—Fe, Fe—Ta—Zr and Cr—Mn—Sn.

13. The method of claim 12, in which:
the trio is Nb—Ta—Zr, forming with Ti a quaternary, alloy TNZT, wherein Ti is present in TNZT at 25 to 60% by weight, Zr is present in TNZT at 5 to 35% by weight, Nb is present in TNZT at 5 to 30% by weight, and Ta is present in TNZT at 1 to 3% by weight.

14. The method of claim 1, wherein:
particles of the first set of particles have a size between 5 microns and 50 microns.

15. The method of claim 1, wherein:
particles of the second set of particles have a size between 5 nm and 250 nm.

16. The method of claim 1, wherein:
the step of exposing the homogeneous mixture to the focused energy source is carried out in a closed chamber under argon gas.

17. The method a of claim 1, in which:
exposure time of an area of the homogeneous mixture to the focused energy source is less than 5 seconds and greater than 10 ms.

* * * * *